United States Patent [19]
Schulz

[11] Patent Number: 5,794,561
[45] Date of Patent: Aug. 18, 1998

[54] WILDLIFE FEEDER

[76] Inventor: John C. Schulz, 408 Iowa St., Burlington, Iowa 52601

[21] Appl. No.: 871,095

[22] Filed: Jun. 9, 1997

[51] Int. Cl.$^6$ ........................................ A01K 5/00
[52] U.S. Cl. .............................. 119/52.1; 119/54
[58] Field of Search ............... 119/52.1, 53, 51.01, 119/54, 56.1, 57.1, 57.92

[56] References Cited

U.S. PATENT DOCUMENTS

| | | | |
|---|---|---|---|
| 1,520,607 | 12/1924 | Smith | 119/52.1 |
| 1,825,033 | 9/1931 | McDougall | 119/54 |
| 2,153,455 | 4/1939 | Casper et al. | 119/54 |
| 4,582,023 | 4/1986 | Zumbahlen et al. | 119/54 X |
| 4,889,078 | 12/1989 | Smiley | 119/52.1 X |
| 5,069,164 | 12/1991 | Wiwi | 119/54 X |
| 5,243,930 | 9/1993 | Rahm | 119/56.1 X |
| 5,243,949 | 9/1993 | Hively | 119/54 X |

*Primary Examiner*—Michael J. Carone
*Assistant Examiner*—Yvonne R. Abbott
*Attorney, Agent, or Firm*—Henderson & Sturm

[57] ABSTRACT

A wildlife feeder including a feed storage bin and a feed trough supported by a central support post. The bin and trough are vertically spaced to allow unobstructed animal access in the area between the bin and the trough.

10 Claims, 2 Drawing Sheets

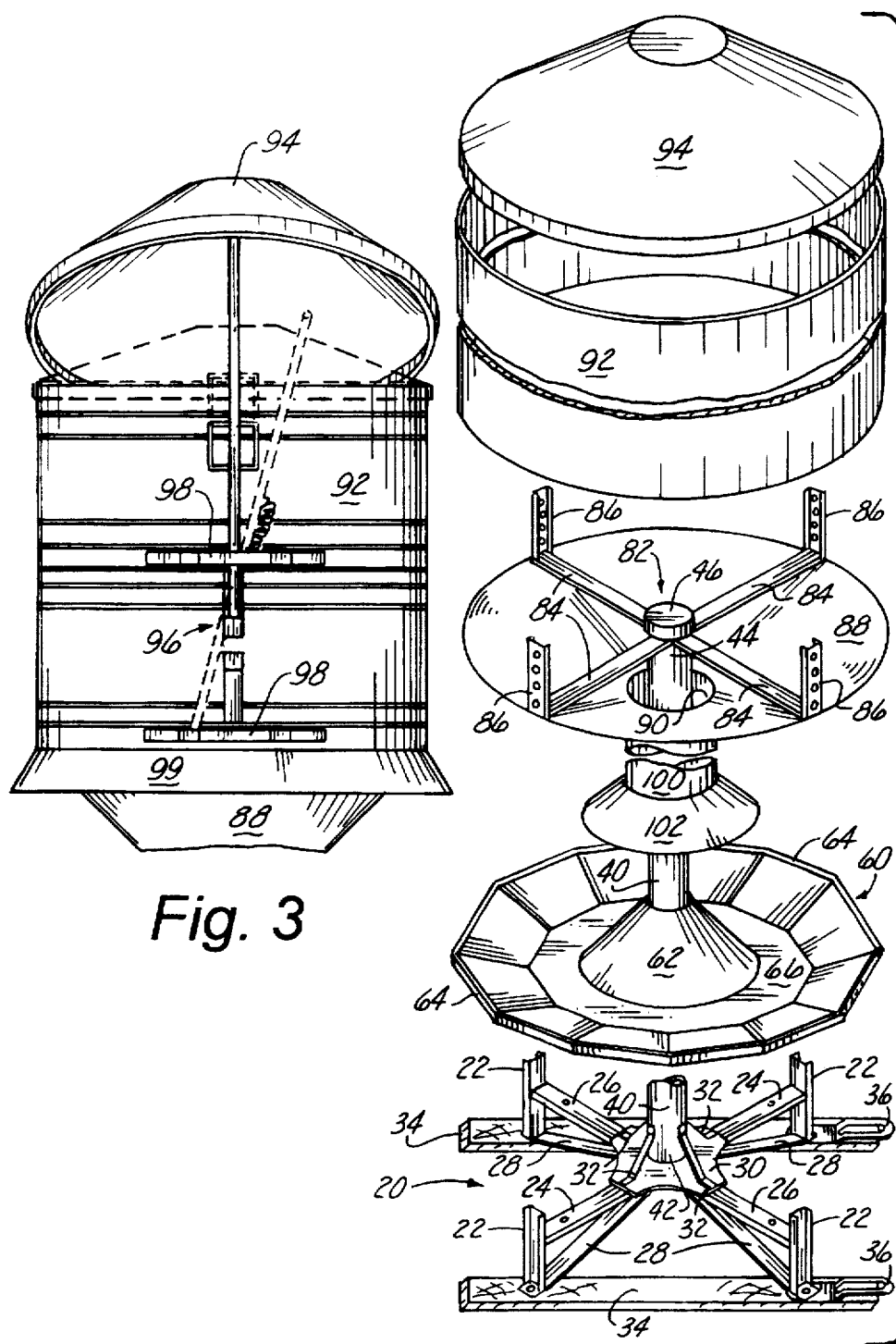

5,794,561

1

WILDLIFE FEEDER

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to animal feeding devices, and more particularly to a wildlife feeder for deer and other wildlife in specialized environments, such as hunting in a controlled setting.

2. Description of the Related Art

With the development of feed especially for wildlife, such as the deer population, a satisfactory method of dispensing the food has been necessitated. Previous attempts to provide a method of dispensing food have included tri-pod type metal supports for a hanging feed bin which present an entrapment-type access to the feed area. The other method presently available is that of the bulk bin which includes spaced structural support legs. This structure presents a "noose" type entrance, and a limited available space for wildlife feeding. Also, animals may lock their horns on the structural supports, and the peripheral vision of the feeding animal is obstructed. Limitations of the presently known wildlife feeders tend to make the wildlife wary of the feeders, thus frustrating their intended purpose.

Those concerned with these and other problems recognize the need for an improved wildlife feeder.

BRIEF SUMMARY OF THE INVENTION

The present invention discloses a wildlife feeder including a feed storage bin and a feed trough supported by a central support post. The bin and trough are vertically spaced to allow unobstructed animal access in the area between the bin and the trough.

Responsive to the increased feeding of deer and other wildlife in controlled settings, this invention meets the demands for feeding deer by providing a feeder with no physical obstructions to feeding. The wildlife can feed without danger of locking horns on leg supports, and they have access to the feeding area without peripheral vision obstructions. The feeder is constructed around a strong center support post, thus eliminating the need for outside legs. The center support post also transfers the load directly into the ground without transferring it through any of the sheet metal parts.

Therefore, an object of the present invention is the provision of an improved wildlife feeder.

Another object of the invention is to provide a wildlife feeder having no physical obstructions limiting the animal's access to the feed available in the trough.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

2

Figure 1:
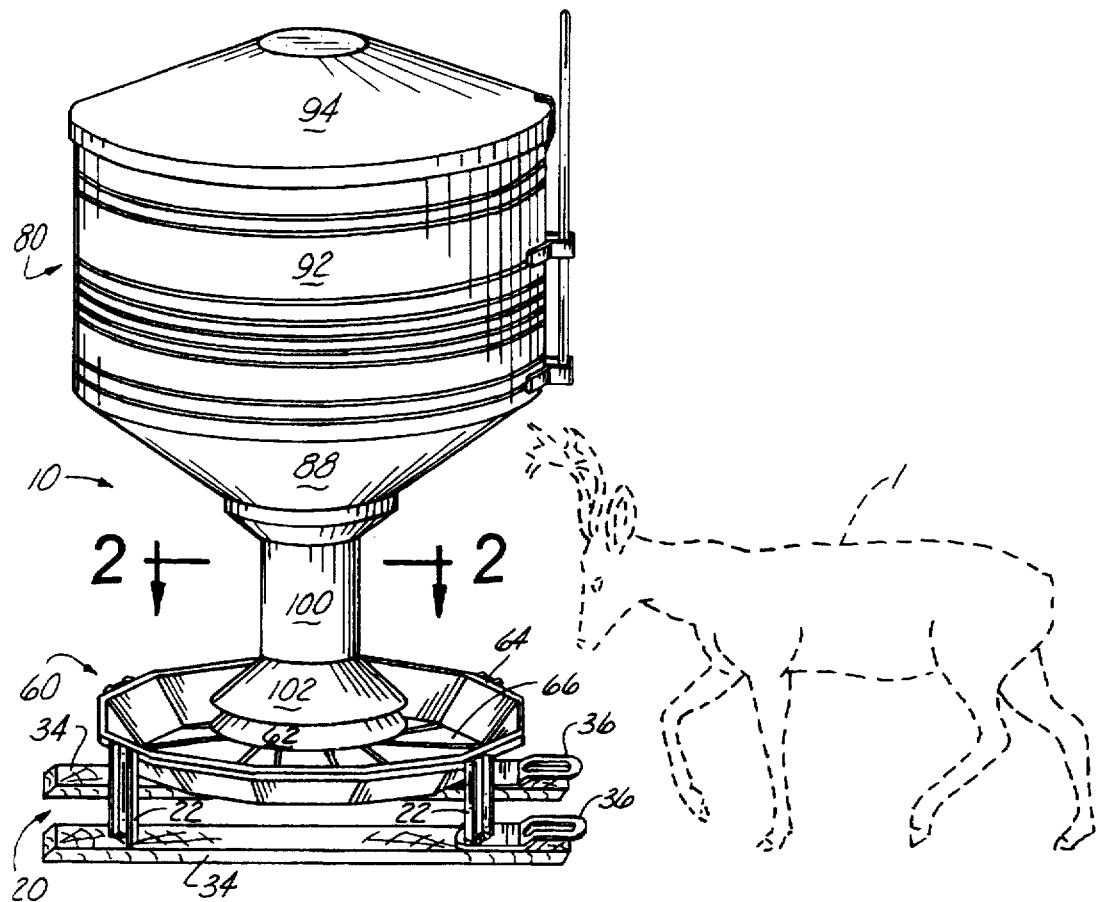
Figure 2:
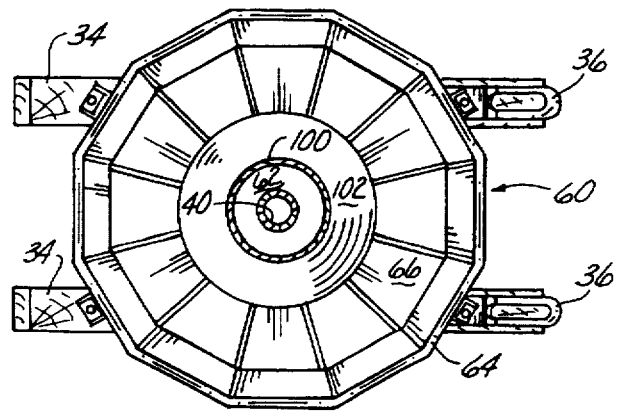

FIG. 1 is a perspective view of the wildlife feeder of the present invention;

FIG. 2 is a top plan sectional view taken along line 2—2 of FIG. 1;

FIG. 3 is a side elevational view of the storage bin showing the cover in the open position ready to receive a supply of feed; and FIG. 4 is an exploded perspective view, with portions foreshortened, illustrating the arrangement of the feeder components.

DETAILED DESCRIPTION OF THE INVENTION

Referring now to the drawings, wherein like reference numerals designate identical or corresponding parts throughout the several views, FIG. 1 shows the wildlife feeder (10) of the present invention, and it illustrates a deer (1) approaching the feeder (10) to feed. The feeder (10) includes a support base (20), a center support post (40), a feed trough (60), and a feed storage bin (80).

The support base (20) is best shown in FIG. 4, and includes four vertical channels (22) interconnected by a horizontal base channel (24) and a pair of horizontal side channels (26). A lower brace (28) extends from the lower end of each vertical channel (22) upward toward the center of the support base (20). A horizontal base plate (30) is attached to the base channel (24) and the side channels (26), and four upper braces (32) extend up from the outer edges of the base plate (30) toward the center of the support base (20). A pair of skids (34) having open loop pulls (36) are attached to the bottoms of the vertical channels (22) to facilitate movement of the feeder (10) from place to place.

The tubular center support post (40) has a lower end (42) attached to and supported by the base plate (30). The four upper braces (32) interconnect the support post (40) and the outer edges of the base plate (30). The upper end (44) of the post (40) is covered by a cap (46).

The feed trough (60) includes a truncated cone member (62) attached to the post (40), and raised outer edge (64) attached to and supported by the upper ends of the vertical channels (22). The flat bottom (66) of the trough (60) rests on the top of the base channel (24) and the side channels (26). Drain holes (not shown) may be provided and spaced around the flat bottom (66) to allow the discharge of moisture from the trough (60) when necessary.

The feed storage bin (80) is supported from the top of the post (40) by a spider weldment (82) including horizontal tubes (84) and vertical shell stiffeners (86). The bin (80) includes a tapered hopper (88) having a bottom discharge opening (90). The cylindrical bin shell (92) is topped by a movable cover (94) which is held in the open position by a lift rod assembly (96). Steps (98) are provided to allow easy access to the bin (80) for inspection and maintenance. FIG. 3 shows an outwardly flared drip ring (99) extending down and out at the juncture of the bottom of the shell (92) and the hopper (88). This prevents moisture from the shell (92) from running down the structure to the feed in the trough (60). The drip ring (99) deflects moisture out from the trough (60) to minimize the chance of wind blowing moisture into the trough (60).

A feed tube (100) is attached to and extends down from the discharge opening (90). The lower end of the feed tube (100) supports an upper truncated cone member (102) that extends outwardly and downwardly toward the trough (60) spaced above the lower cone member (62). The feed tube (100) is concentrically disposed around the support post (40) to form an annular feed passageway between the bin (80) and the trough (60). Eight bolts (not shown) are radially spaced around and extend up from the lower cone member (62) a distance of about one and one-half inches to maintain the spacing between the cone members (62 and 102) and stabilize the structure.

In operation the feeder (10) is transported to a desired location by pulling it with a tractor or pickup truck attached to the skids (34). Animal feed is charged to the bin (80) and the cover (94) is secured in position. Feed from the bin (80) falls by gravity through the feed tube (100) to the trough (60). When the level of feed in the trough (60) reaches the lower edge of the upper cone (102), the flow of feed is stopped. As animals eat from the trough (60) and the level of feed in the trough (60) drops below the lower edge of the upper cone (102), additional feed is discharged to refill the trough (60).

The feeder (10) may be constructed of plastic or sheet metal with no support posts or peripheral obstructions. The feeder (10) is constructed with a center support post (40) upon which all the exterior structure is mounted. This permits the weight to be transferred to the center member and thence into the ground. Thus, there is no need for the customary support legs of a tri-pod mounted feeder or the structural support legs of a bulk bin type feeder. This center support system allows an unobstructed space between the bottom of the bin (80) and the trough (60), and allows open access to the feeding animals.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A wildlife feeder, comprising:

a ground engaging support base;

a center support post having a lower end and an upper end, the lower end being attached to the base;

a feed storage bin having a bottom discharge opening, the bin being attached to the post near its upper end, and the discharge opening being disposed adjacent the upper end of the post; and a feed trough attached to the post near its lower end and disposed to extend radially out therefrom, the trough being spaced downwardly from the bin providing an unobstructed animal access to the trough in an area between the bin and the trough.

2. The wildlife feeder of claim 1 further including a feed tube having an upper end attached to the storage bin at the discharge opening and an open lower end disposed above the trough, the feed tube being concentrically disposed around the post forming an annular feed passageway between the bin and the trough.

3. The wildlife feeder of claim 2 wherein the post is a tubular member including a cap attached to and enclosing the upper end of the post.

4. The wildlife feeder of claim 3 wherein the trough further includes a truncated lower cone member attached to the post and extending downwardly and outwardly therefrom.

5. The wildlife feeder of claim 4 further including a truncated upper cone member attached to the feed tube near its lower end and extending downwardly and outwardly toward the trough, and being spaced above the lower cone member.

6. The wildlife feeder of claim 2 wherein the trough further includes a truncated lower cone member attached to the post and extending downwardly and outwardly therefrom.

7. The wildlife feeder of claim 6 further including a truncated upper cone member attached to the feed tube near its lower end and extending downwardly and outwardly toward the trough, and being spaced above the lower cone member.

8. The wildlife feeder of claim 1 wherein the trough includes an outer upwardly extending edge.

9. The wildlife feeder of claim 8 wherein the outer edge of the trough rests on and is supported by the base.

10. The wildlife feeder of claim 1 wherein the base further includes a pair of spaced ground engaging skids.

* * * * *